US011845530B2

(12) United States Patent
Morris et al.

(10) Patent No.: US 11,845,530 B2
(45) Date of Patent: Dec. 19, 2023

(54) COMPACT FOLDABLE MULTICOPTER UNMANNED AERIAL VEHICLE FOR CARGO DELIVERY

(71) Applicant: Sierra Nevada Corporation, Sparks, NV (US)

(72) Inventors: Stephen Morris, Sunnyvale, CA (US); Jean-Francois Clavreul, Berkeley, CA (US)

(73) Assignee: Sierra Nevada Corporation, Sparks, NV (US)

(*) Notice: Subject to any disclaimer, the term of this patent is extended or adjusted under 35 U.S.C. 154(b) by 0 days.

(21) Appl. No.: 17/703,815

(22) Filed: Mar. 24, 2022

(65) Prior Publication Data
US 2022/0306272 A1     Sep. 29, 2022

Related U.S. Application Data

(60) Provisional application No. 63/165,156, filed on Mar. 24, 2021.

(51) Int. Cl.
*B64C 1/30* (2006.01)
*B64C 39/02* (2023.01)
*B64U 30/20* (2023.01)

(52) U.S. Cl.
CPC .............. *B64C 1/30* (2013.01); *B64C 39/024* (2013.01); *B64U 30/20* (2023.01)

(58) Field of Classification Search
CPC ...... B64U 30/293; B64U 20/50; B64U 80/00; B64U 80/70; B64C 1/30; B64C 29/0025
See application file for complete search history.

(56) References Cited

U.S. PATENT DOCUMENTS

| 1,922,167 | A | * | 8/1933 | Leray | B64C 29/0025 |
| | | | | | 244/6 |
| 10,793,270 | B2 | * | 10/2020 | Chen | B64C 39/024 |
| 2009/0008499 | A1 | * | 1/2009 | Shaw | B64C 27/20 |
| | | | | | 244/17.23 |
| 2016/0207626 | A1 | * | 7/2016 | Bailey | B64C 39/022 |
| 2018/0148168 | A1 | * | 5/2018 | Newman | B64C 27/50 |
| 2018/0244363 | A1 | * | 8/2018 | Lee | B64C 39/024 |
| 2018/0312254 | A1 | * | 11/2018 | Ni | B64C 1/063 |
| 2018/0327092 | A1 | * | 11/2018 | Deng | B64C 39/024 |
| 2019/0112025 | A1 | * | 4/2019 | Sugaki | B64D 9/00 |
| 2020/0031460 | A1 | * | 1/2020 | Millhouse | G06Q 10/083 |

* cited by examiner

*Primary Examiner* — Christopher D Hutchens
(74) *Attorney, Agent, or Firm* — Mintz Levin Cohn Ferris Glovsky and Popeo, P.C.

(57) ABSTRACT

An unmanned aerial vehicle includes a fuselage having a first side and a second side, a first arm disposed on a first side of the fuselage, wherein the first arm is coupled to one or more first propellers, wherein the first arm is adapted to move between a first folded position in which the first arm is in a folded state inside the fuselage and a first extended position in which a first section of the first arm and the one or more first propellers are outside the fuselage, and a second arm disposed on the second side of the fuselage, wherein the second arm is coupled to one or more second propellers, wherein the second arm is adapted to move between a second folded position in which the second arm is in a folded state inside the fuselage and a second extended position in which a second section of the second arm and the one or more second propellers are outside the fuselage.

5 Claims, 9 Drawing Sheets

COMPACT FOLDABLE MULTICOPTER UNMANNED AERIAL VEHICLE FOR CARGO DELIVERY

CROSS-REFERENCE TO RELATED APPLICATIONS

This application claims the benefit of U.S. Application No. 63/165,156, filed Mar. 24, 2021, which is hereby incorporated by reference in its entirety.

FIELD OF THE INVENTION

This specification relates generally to aerial vehicles, and more particularly to unmanned aerial vehicles, propeller systems for unmanned aerial vehicles, and methods of deploying and storing the same.

BACKGROUND

Unmanned aerial vehicles (UAVs) are used for a variety of purposes. For example, UAVs are used by the military to perform reconnaissance and to aid in combat, by law enforcement agencies to perform surveillance, and by commercial enterprises to deliver products to customers.

The storage and transportation of UAVs poses particular challenges. Many UAV operators face storage space limitations that complicate the storage of unused UAVs. Similarly, transporting a UAV requires an allocation of scarce storage space in the transportation vehicle.

Accordingly, there is a continuing need for a UAV that has a compact configuration with minimal storage space requirements.

SUMMARY

In accordance with an embodiment, a vehicle includes a fuselage having a first side and a second side, a first arm disposed on a first side of the fuselage, wherein the first arm is coupled to one or more first propellers, wherein the first arm is adapted to move between a first folded position in which the first arm is in a folded state inside the fuselage and a first extended position in which a first section of the first arm and the one or more first propellers are outside the fuselage, and a second arm disposed on the second side of the fuselage, wherein the second arm is coupled to one or more second propellers, wherein the second arm is adapted to move between a second folded position in which the second arm is in a folded state inside the fuselage and a second extended position in which a second section of the second arm and the one or more second propellers are outside the fuselage.

In one embodiment, the vehicle is an unmanned aerial vehicle.

In another embodiment, the first arm includes a first portion and a second portion joined by a connector. The first portion and the second portion form an angle between 10 degrees and 30 degrees when the first arm is in the first folded position. The first portion and the second portion form an angle of 180 degrees when the first arm is in the first extended position.

In another embodiment, the first portion and the second portion define a first plane when the first arm is in the first folded position, and the first portion and the second portion define a second plane when the first arm is in the extended position. The intersection of the first and second planes forms a predetermined angle, for example, an angle between 45 and 90 degrees.

In one embodiment, the vehicle includes a plurality of rods coupled to the first arm, and a plurality of propellers, each propeller being coupled to one of the plurality of rods. Each of the plurality of rods is adapted to move between a first rod position in which the respective rod is not perpendicular to the first arm and a second rod position in which the respective rod is perpendicular to the first arm. Each respective rod is in the first rod position when the first arm is in the first folded position, and each respective rod is in the second rod position when the first arm is in the extended position.

In another embodiment, the first arm is coupled to four propellers.

In accordance with another embodiment, a vehicle includes a fuselage having an internal volume and an arm adapted to move between a stored position and an extended position. The arm includes a first portion coupled to the fuselage, a second portion coupled to the first portion, and at least one propeller coupled to the second portion of the arm. The first portion and the second portion are adapted to move between a folded configuration and an extended configuration. The first portion and the second portion are in the folded configuration, and the first portion, the second portion, and the at least one propeller fit within the volume inside the fuselage, when the arm is in the stored position. The first portion and the second portion are in the extended configuration, the second portion extends outside the volume, and the at least one propeller is outside the fuselage, when the arm is in the extended position.

In one embodiment, the first portion and the second portion are in the folded configuration and define a first plane, when the arm is in the stored position. The first portion and the second portion are in the extended configuration and define a second plane perpendicular to the first plane, when the arm is in the extended position.

In another embodiment, the vehicle also includes a plurality of rods coupled to the second portion, and a plurality of propellers, each propeller coupled to a respective one of the plurality of rods. Each of the plurality of rods is adapted to move between a first, folded position and a second, extended position.

In another embodiment, the vehicle also includes four rods coupled to the second portion, and four propellers, each propeller coupled to a respective one of the four rods.

In another embodiment, the volume inside the fuselage is adapted to hold items of cargo when the arm is in the extended position.

In another embodiment, the vehicle also includes a plurality of doors disposed in a surface of the fuselage, wherein the plurality of doors are adapted to open and close, wherein the plurality of doors allow access to the volume inside the fuselage when open, wherein the plurality of doors protect items inside the volume when closed.

In another embodiment, the vehicle also includes a plate disposed in the volume, the plate being attached to the fuselage. The first portion of the arm is coupled to the plate.

In accordance with another embodiment, a method for deploying a propeller system of an unmanned aerial vehicle includes opening the doors of the vehicle, moving the propeller system arm from a folded, stored position to a folded, elevated position, moving the propeller system arm from the folded, elevated position to an extended position, closing the doors of the vehicle, and moving the propeller support rods from the folded position to an extended position.

In accordance with another embodiment, a method for retracting a propeller system of an unmanned aerial vehicle include moving the propeller support rods from an extended position to a folded position, opening the doors of the vehicle, moving the propeller system arm from an extended position to a folded, elevated position, moving the propeller system arm from the folded, elevated position to a folded, stored position, and closing the doors of the vehicle.

These and other advantages of the present disclosure will be apparent to those of ordinary skill in the art by reference to the following Detailed Description and the accompanying drawings.

BRIEF DESCRIPTION OF THE DRAWINGS

The present disclosure will become better understood from the detailed description and the drawings, wherein.

DETAILED DESCRIPTION

In accordance with an embodiment, an unmanned aerial vehicle has a propeller system adapted to move from a first stored position in which it is folded and stored within the vehicle's fuselage and a second deployed position in which it extends outside the fuselage. Advantageously, the propeller system may be stored in the first position when the vehicle is not used, and deployed in the second position when the vehicle is used.

In accordance with an embodiment, a vehicle includes a fuselage having a first side and a second side, a first arm disposed on a first side of the fuselage, wherein the first arm is coupled to one or more first propellers, wherein the first arm is adapted to move between a first stored position in which the first arm is in a folded state inside the fuselage and a first extended position in which a first section of the first arm and the one or more first propellers are outside the fuselage, and a second arm disposed on the second side of the fuselage, wherein the second arm is coupled to one or more second propellers, wherein the second arm is adapted to move between a second stored position in which the second arm is in a folded state inside the fuselage and a second extended position in which a second section of the second arm and the one or more second propellers are outside the fuselage.

The terms "unmanned aerial vehicle" and "drone" are used interchangeably herein.

Figure 1:
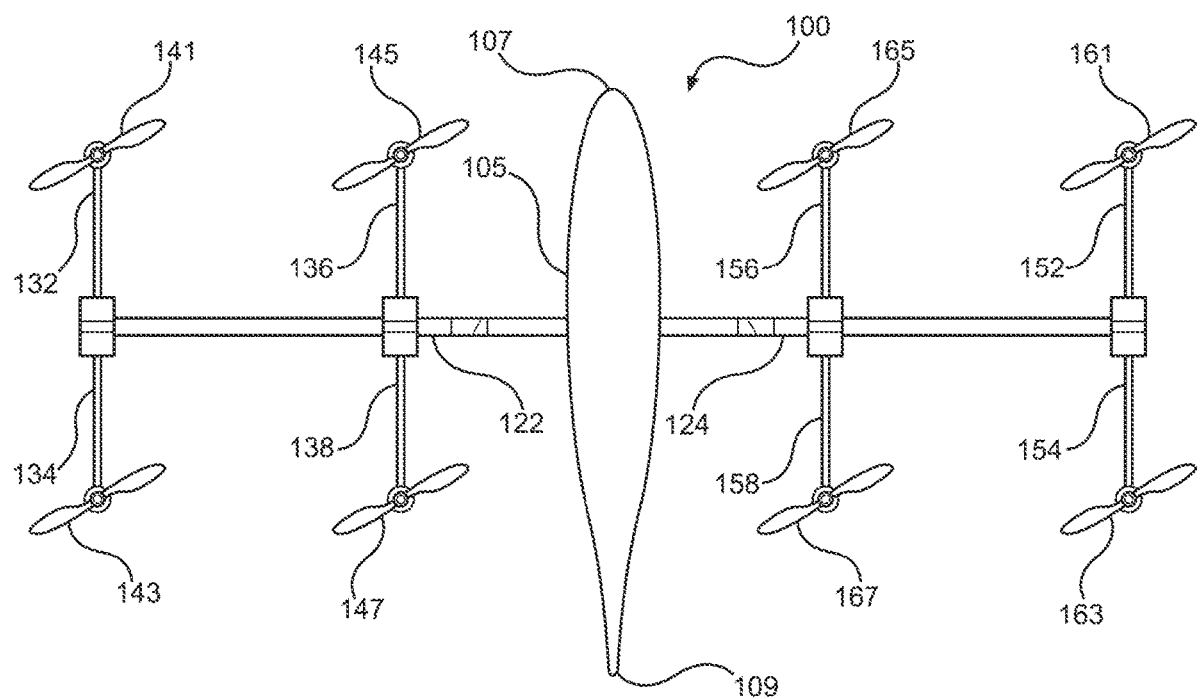
FIG. 1 shows an unmanned aerial vehicle in accordance with an embodiment.

FIG. 1 shows an unmanned aerial vehicle 100 in accordance with an embodiment.

Unmanned aerial vehicle 100 is sometimes referred to herein as drone 100. Drone 100 includes a fuselage 105 having a front end 107 and a back end 109, a left propeller system arm 122 and a right propeller system arm 124. Each propeller system arm supports a plurality of propeller support rods, which in turn support respective propellers.

Specifically, outer propeller support rods 132, 134 are connected to left arm 122 at the outer end of left arm 122. Inner propeller support rods 136, 138 are connected to left arm 122 at an intermediate point on left arm 122. Propellers 141, 143, 145, 147 are connected to the ends of rods 132, 134, 136, 138, respectively. Outer rods 152, 154 are connected to right arm 124 the end of right arm 124. Inner rods 156, 158 are connected to right arm 124 at an intermediate point on right arm 124. Propellers 161, 163, 165, 167 are connected to the ends of rods 152, 154, 156, 158, respectively.

In accordance with an embodiment, left arm 122 and right arm 124 have an extended position and a folded, stored position. FIG. 1 shows drone 100 with the left and right arms deployed in the extended position.

In accordance with an embodiment, left and right arms 122, 124 may be folded and stored in fuselage 105. To allow storage of the left and right arms, each side of the fuselage has a pair of doors capable of opening and allowing the arms to be retracted into the fuselage.

Various components of drone 100 may be formed of any suitable material such as metal, plastic, composite materials, etc.

Figure 2:
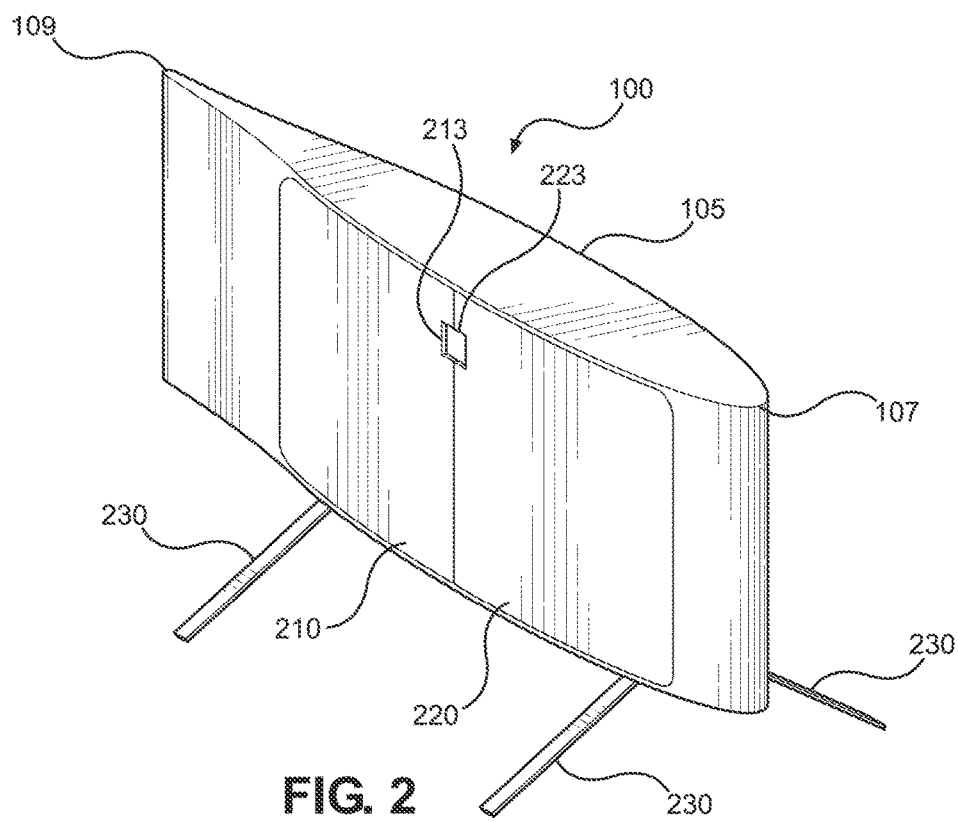
FIG. 2 shows a perspective view of a UAV in accordance with an embodiment.

FIG. 2 shows a perspective view of drone 100 position in accordance with an embodiment.

Drone 100 includes doors 210, 220 disposed on the right side of fuselage 105. A corresponding pair of doors (not shown in FIG. 2) are disposed on the left side of fuselage 105. Door 210 has a notch 213 and door 220 has a notch 223; notches 213 and 223 form an opening when doors 210, 220 are closed. In FIG. 2, doors 210 are closed, and left and right arms 122, 124 are in the folded, stored position inside the fuselage.

Drone 100 also includes a plurality of legs 230 which function as landing gear and allow the drone to land and to rest in a stable position on the ground. In some embodiments, legs 230 are retractable.

In accordance with an embodiment, left and right propeller system arms 122, 124 are adapted to be deployed by unfolding and moving from the folded, stored position to the extended position. FIGS. 3-11 illustrate the movement of right propeller system arm 124 from the folded, stored position to the extended position in accordance with an embodiment. While only the movements of right arm 124 are illustrated in the Drawings, it is to be understood that left arm 122 moves from a folded, stored position to an extended position in a similar manner.

Figure 3:
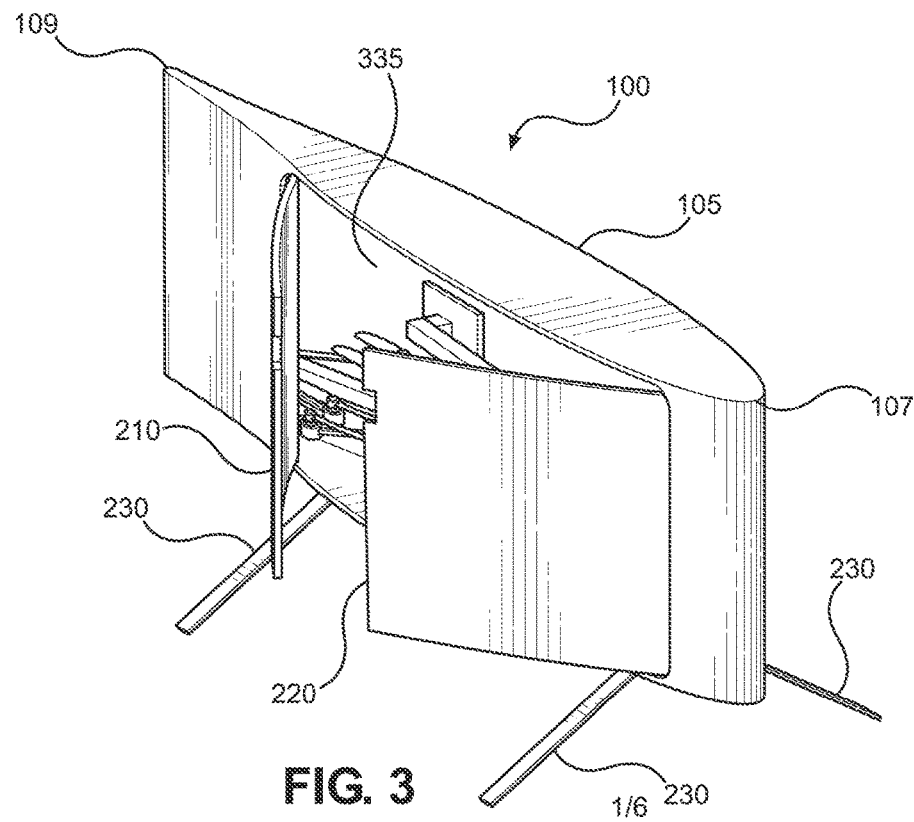
FIG. 3 shows a UAV with the right side door partially open and the right arm in the folded, stored position in accordance with an embodiment.
Figure 4:
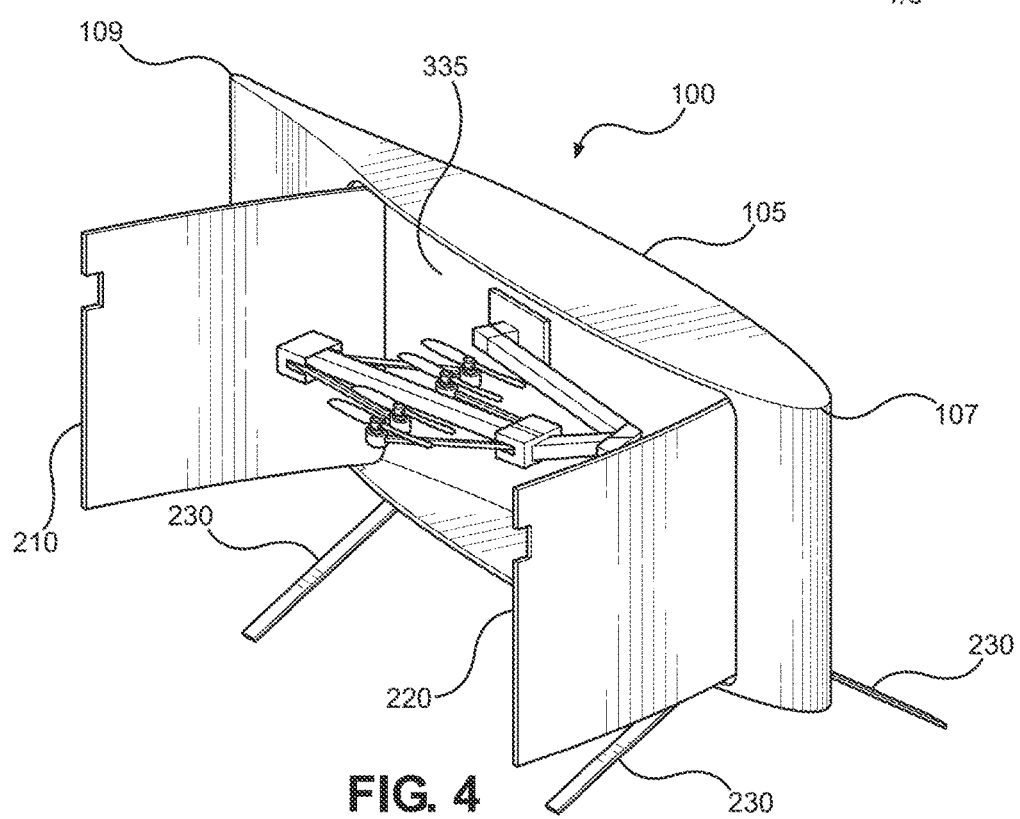
FIG. 4 shows a UAV with the right side door open and the right arm in the folded, stored position in accordance with an embodiment.

Referring to FIGS. 3-4, doors 210, 220 open to expose right arm 124 stored in the folded, stored position within a cargo bay 335. Cargo bay 335 comprises a volume within fuselage 105. Cargo bay 335 accommodates both left arm 122 and right arm 124 in the folded, stored position.

Figure 5:
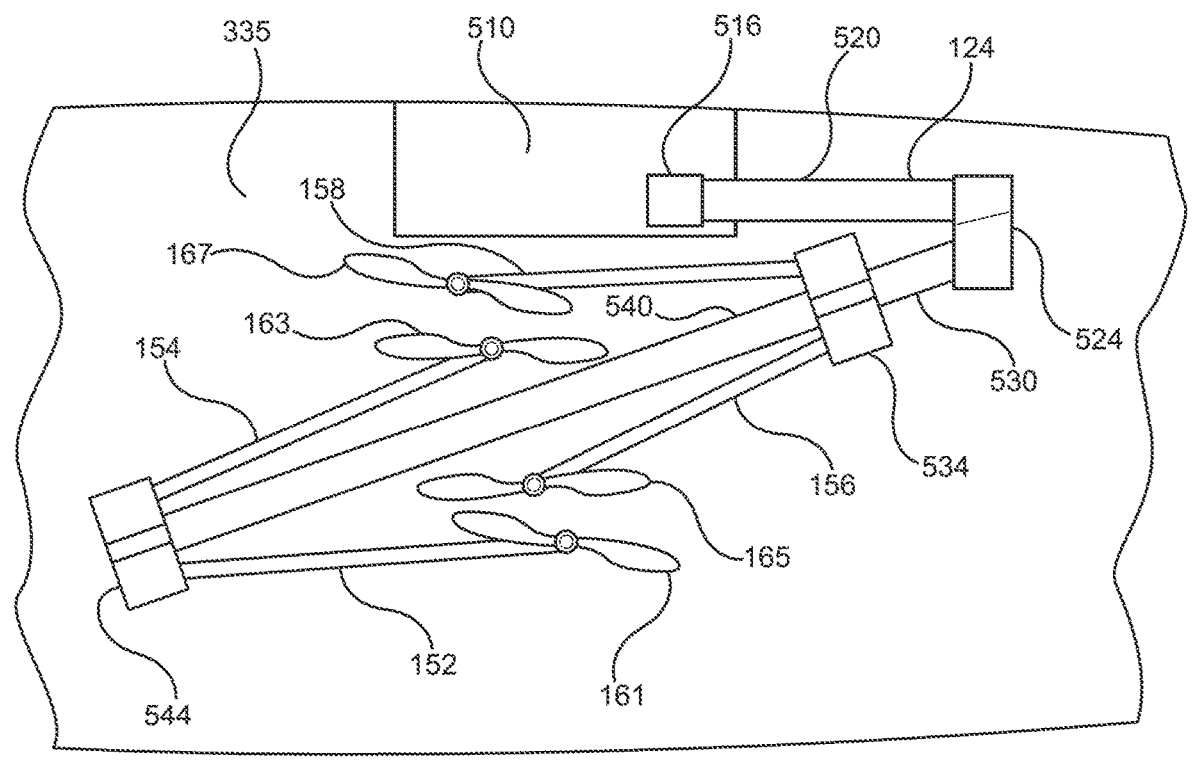
FIG. 5 shows the right arm of a UAV in a folded, stored position within the cargo bay of the UAV in accordance with an embodiment.

FIG. 5 shows right propeller system arm 124 in the folded, stored position within cargo bay 335 in accordance with an embodiment. When in the folded, stored position, right arm 124 fits entirely within the volume of cargo bay 335, inside fuselage 105.

Right arm 124 includes a first portion 520, a second portion 530 and a third portion 540. First portion 520 is fixed to fuselage 105. In the illustrative embodiment, first portion 520 is attached to a plate 510 which is fixed to fuselage 105 within cargo bay 335. First portion 520 is attached to plate 510 via a connector 516, which is adapted to allow first portion 520 to rotate from a position parallel to the surface of plate 510 (as shown in FIG. 5) to a position perpendicular to plate 510. In other embodiments, first portion 520 may be attached to fuselage 105 in a different manner.

Connector 516 is also adapted to allow right wing 124 to rotate a predetermined number of degrees (for example, 90 degrees) from a folded, stored position (as shown in FIG. 5) to a folded, elevated position. The movement of right wing 124 from the folded, stored position to the folded, elevated position is discussed below.

Second portion 530 is connected to first portion 520 via a connector 524. First portion 520 and second portion 530 have a folded configuration and an extended configuration. FIG. 5 shows first portion 520 and second portion 530 in the folded configuration, in which first portion 520 and second portion 530 form an angle, for example, between 10 and 30 degrees. Other angles may be used. In the extended configuration, first portion 520 and second portion 530 form an angle of 180 degrees. Connector 524 is adapted to allow first portion 520 and second portion 530 to move from the folded configuration to the extended configuration.

Third portion 540 is connected to second portion 530 via connector 534. Second portion 530 and third portion 540 are fixed in a configuration that defines a fixed straight line. In another embodiment, second portion 530 and third portion 540 may be a single integrated shaft portion onto which connector 534 is attached at a selected location. Because of their fixed configuration, second portion 530 and third portion 540 are sometimes collectively referred to herein as a single shaft portion.

Connector 534 also holds an end of propeller support rod 156 and an end of propeller support rod 158. Rods 156, 158 have a folded position (shown in FIG. 5), in which the rods are not perpendicular to the shaft portion (second portion 530 and third portion 540), and an extended position, in which the rods are perpendicular to the shaft portion. Connector 534 is adapted to allow rods 156 and 158 to move between the folded position and the extended position.

A connector 544 is attached to an end of portion 540. Connector 544 also holds an end of propeller support rod 152 and an end of propeller support rod 154. Rods 152, 154 have a folded position (shown in FIG. 5), in which the rods are not perpendicular to the shaft portion, and an extended position, in which the rods are perpendicular to the shaft portion. Connector 544 is adapted to allow rods 152 and 154 to move between the folded position and the extended position.

Figure 6A:
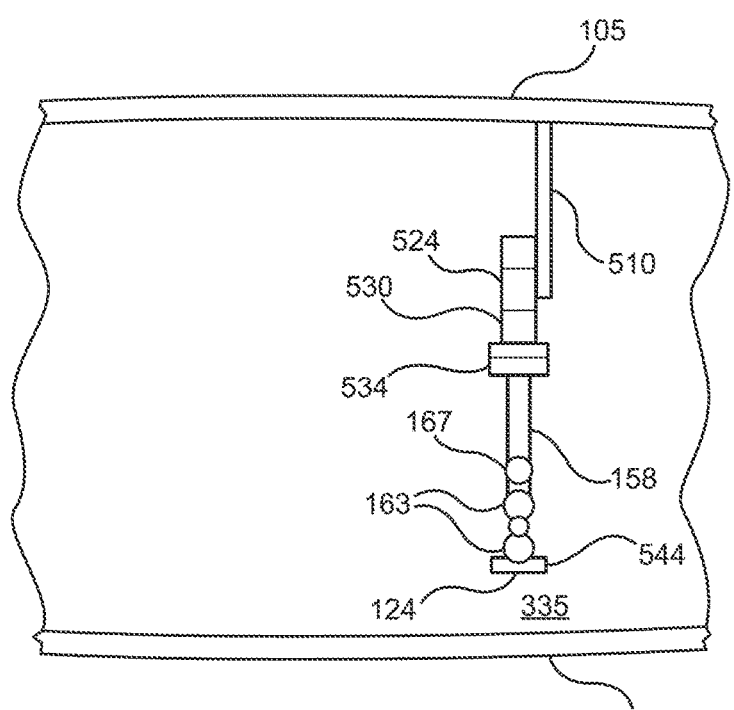
FIGS. 6A-6C show a side view of the right arm of a UAV during the movement from the folded, stored position to the folded, elevated position in accordance with an embodiment.
Figure 6B:
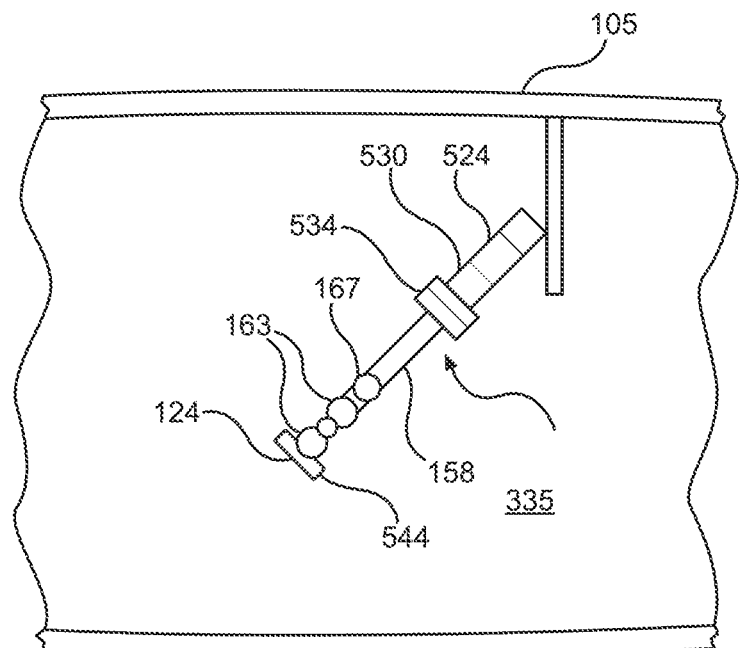
Figure 6C:
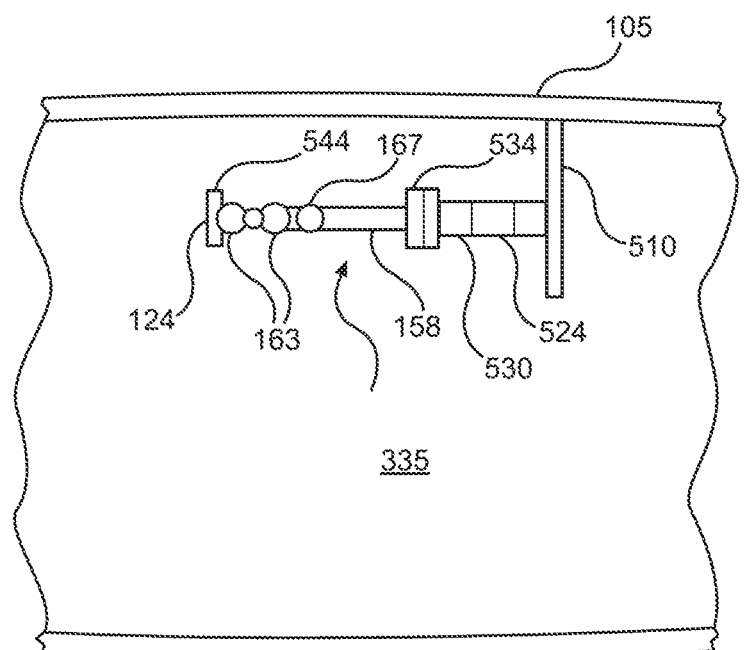

In accordance with an embodiment, right arm 124 rotates a predetermined number of degrees (for example, 90 degrees) from the folded, stored position shown in FIG. 5 to a folded, elevated position in which a portion of the right arm is outside cargo bay 335. When right arm 124 is in the folded, elevated position, first portion 520 and second portion 530 of the arm remain in the folded configuration. FIGS. 6A-6C show a side view of right arm 124 showing the movement of right arm 124 from the folded, stored position to the folded, elevated position in accordance with an embodiment. FIG. 6A shows right arm 124 in the stored position within cargo bay 335. FIG. 6B shows right arm 124 in an intermediate position between the stored position and the elevated position. FIG. 6C shows right arm 124 in the elevated position. In the elevated position, a portion of right arm 124 projects from and is outside cargo bay 335.

Figure 7A:
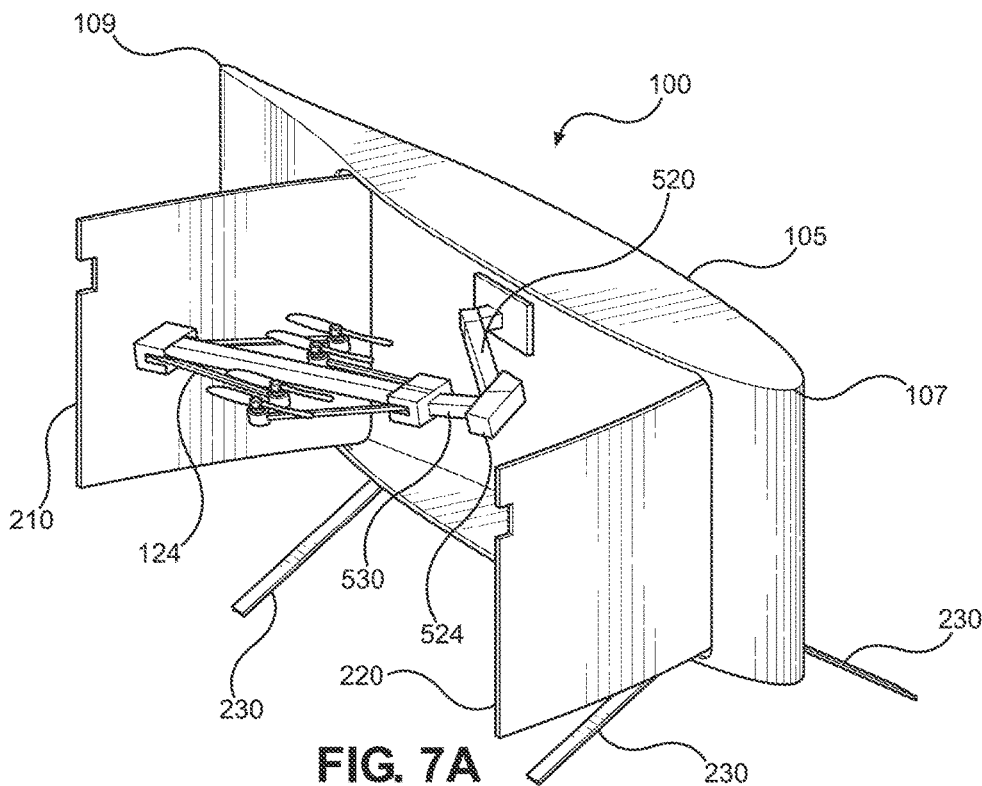
FIG. 7A shows a UAV with the right side doors open and the right arm in the folded, elevated position in accordance with an embodiment.

FIG. 7A shows drone 100 with doors 210, 220 open and right arm 124 in the folded, elevated position in accordance with an embodiment. As shown in FIG. 7A, when right arm 124 is in the folded, elevated position, first portion 520 and second portion 530 of the arm are in the folded configuration.

In one embodiment, first portion 520, second portion 530, and third portion 540 define a first plane that is parallel to plate 510 when right arm 124 is in the folded, stored position.

First portion 520, second portion 530, and third portion 540 define a second plane that is perpendicular to the first plane when right arm 124 is in the elevated position. In other embodiments, the intersection of the first plane and the second plane form an angle between 45 degrees and 90 degrees.

Figure 7B:
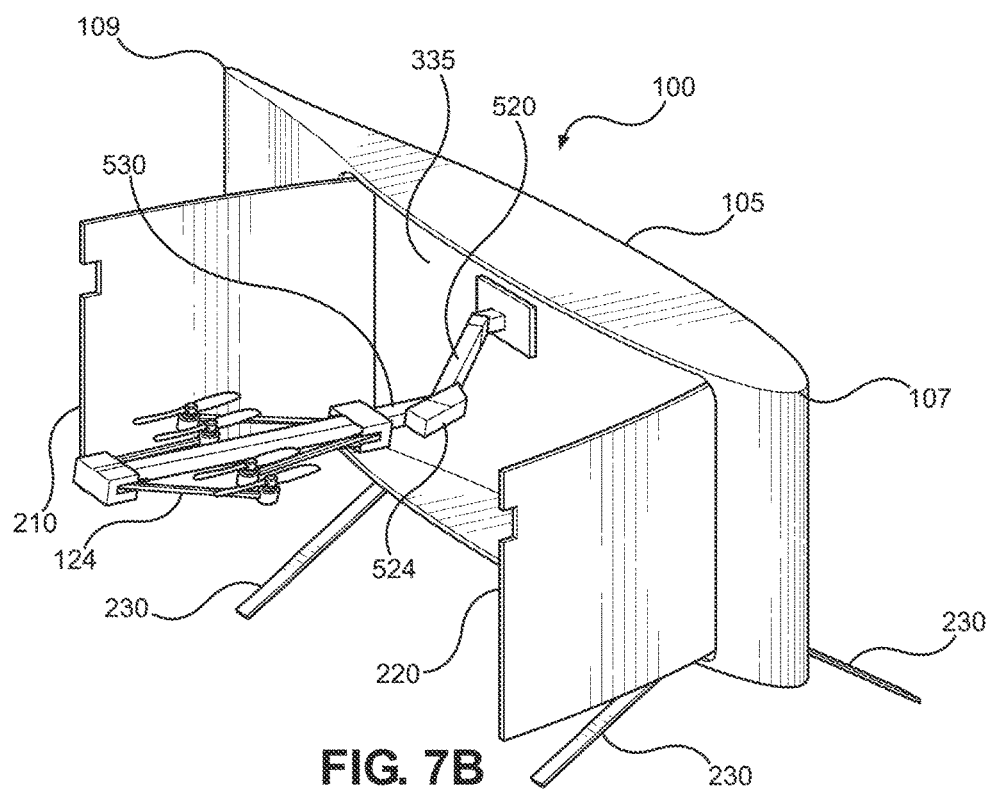
FIG. 7B shows a UAV with the right side doors open and the right arm in an intermediate position between the folded, elevated position and the extended position in accordance with an embodiment.
Figure 8:
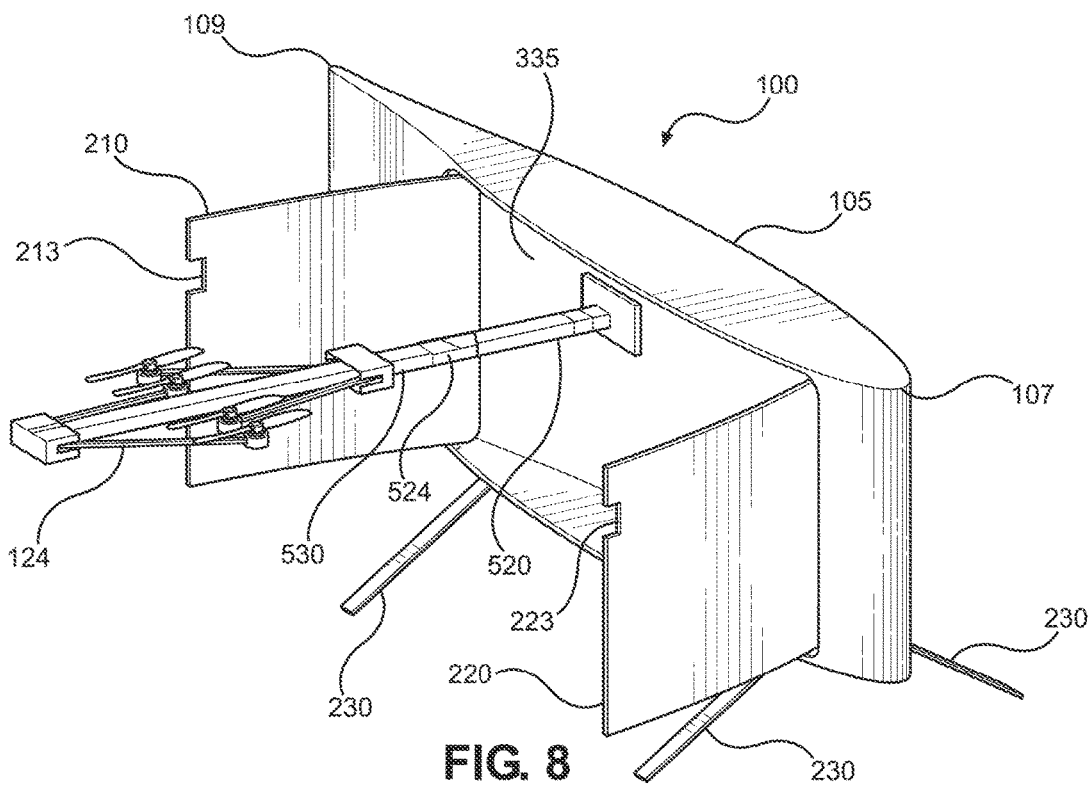
FIG. 8 shows a UAV with the right side doors open and the right arm in the extended position in accordance with an embodiment.

In accordance with an embodiment, first portion 520 and second portion 530 of right arm 124 move from the folded configuration to the extended configuration, causing right arm 124 to move from the folded, elevated position to the extended position. As stated, in FIG. 7A, first portion 520 and second portion 530 are in the folded configuration. FIG. 7B shows drone 100 with doors 210, 220 open and right arm 124 in an intermediate position between the folded, elevated position shown in FIG. 7A and the extended position. In the intermediate position shown in FIG. 7B, first portion 520 and second portion 530 form an angle of approximately 90 degrees and thus are in an intermediate position between the folded configuration and the extended configuration. FIG. 8 shows drone 100 with first portion 520 and second portion 530 of right arm 124 in the extended configuration in accordance with an embodiment. In the extended configuration, first portion 520 and second portion 530 form an angle of 180 degrees. As a result, right arm 124 is in the extended position.

While the illustrative embodiment shows right arm 124 moving from the from the folded, stored position shown in FIG. 5, to the folded, elevated position shown in FIG. 7, and then to the extended position shown in FIG. 8, in other embodiments, the movement from the folded, stored position shown in FIG. 5 to the folded, extended position shown in FIG. 8 may occur using a different series of movements.

For example, certain movements depicted in the illustrative embodiment as separate, distinct movements may occur simultaneously. For example, first portion 520 and second portion 530 may simultaneously unfold and rotate from a stored position to an extended position while the arm is moving from the folded stored position to the extended position.

Figure 9:
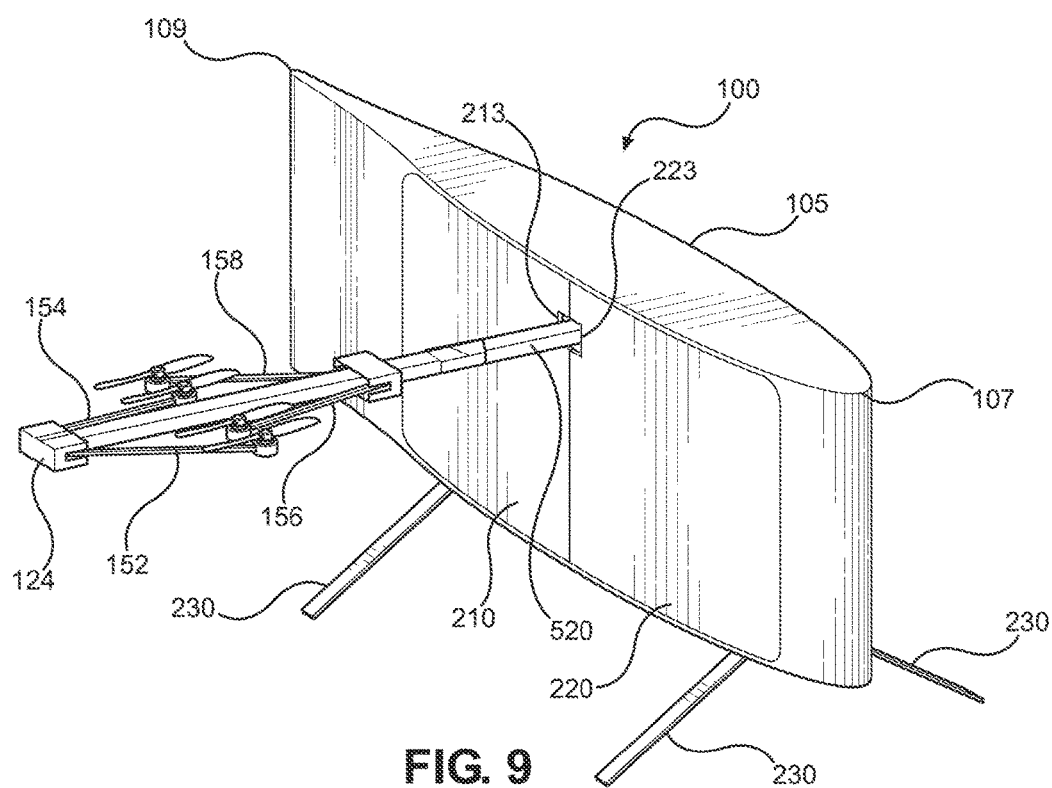
FIG. 9 shows a UAV with the right arm in the extended position and the right side doors closed in accordance with an embodiment.

In accordance with an embodiment, doors 210, 220 of drone 100 may be closed after right arm 124 moves to the extended position. As doors 210, 220 close, notches 213, 223 fit around first portion 520 of right arm 124, allowing the doors to close smoothly. FIG. 9 shows drone 100 with right arm 124 in the extended position and doors 210, 220 closed in accordance with an embodiment.

Figure 10:
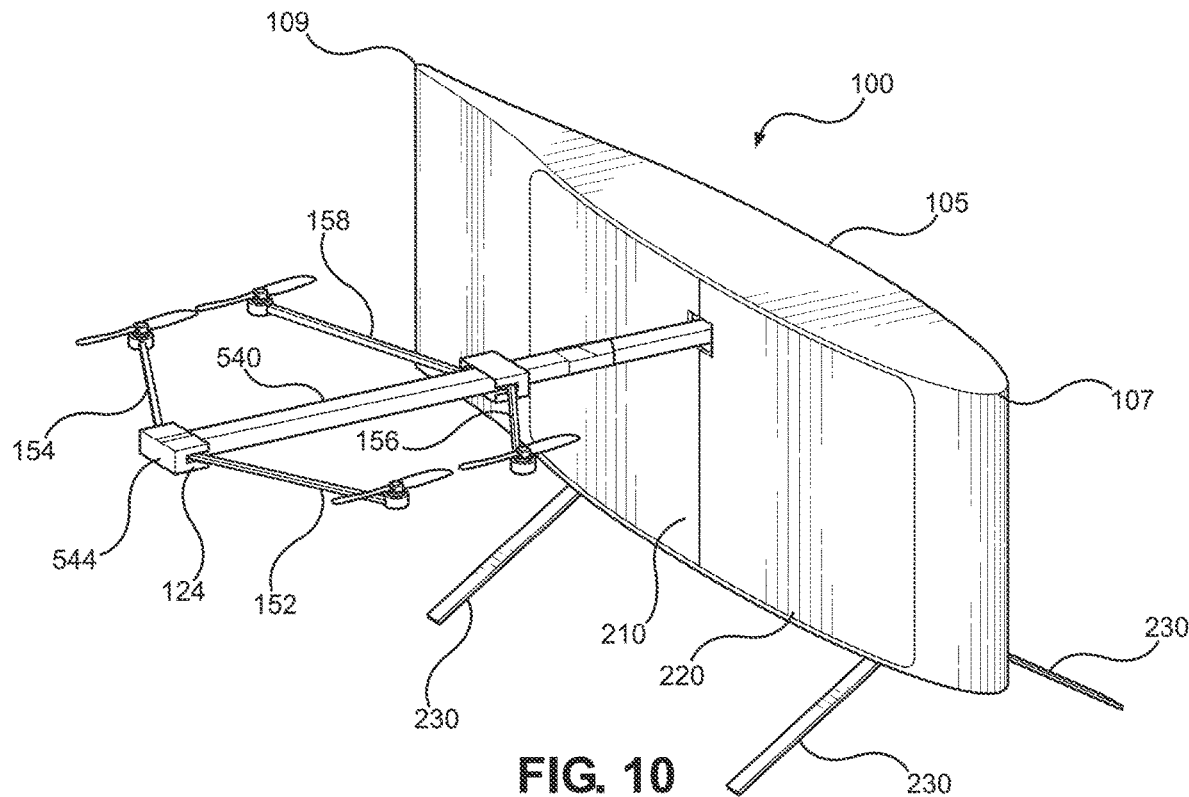
FIG. 10 shows a UAV with the propeller support rods in an intermediate position between a folded position and an extended position in accordance with an embodiment.
Figure 11:
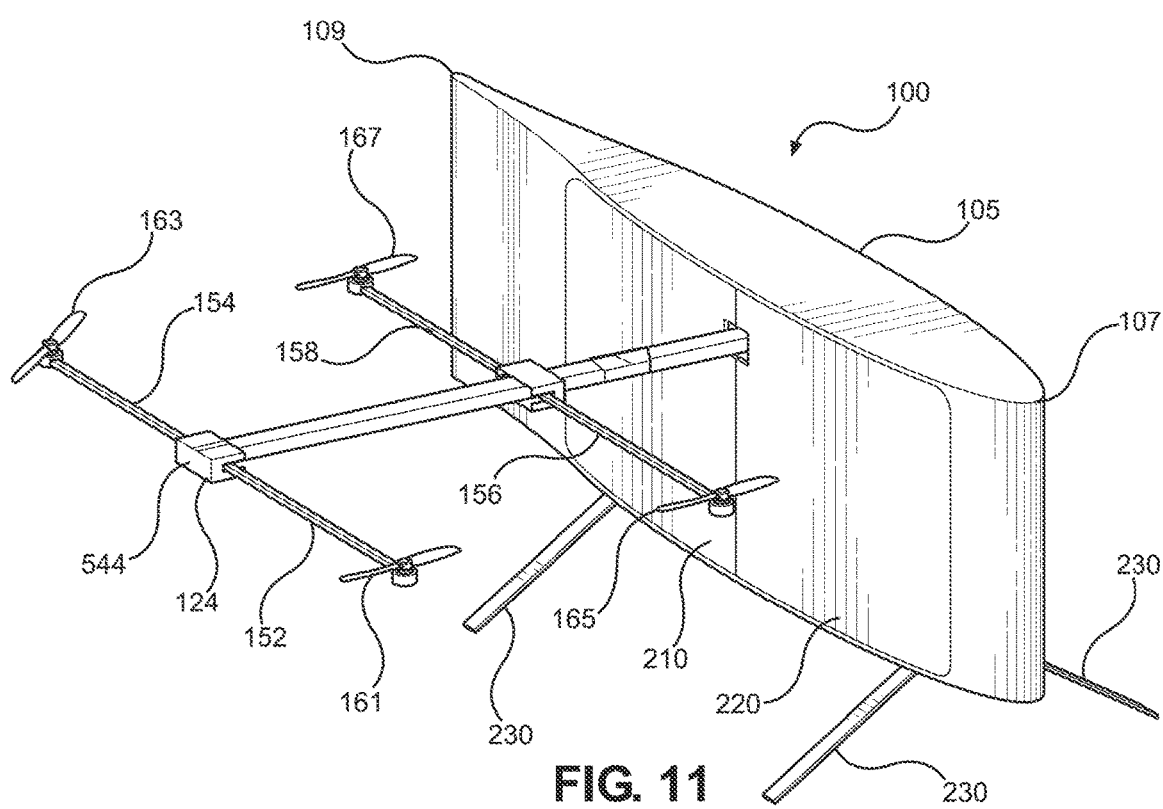
FIG. 11 shows a UAV with the propeller support rods in the extended position in accordance with an embodiment.

After right arm 124 moves to the extended position, propeller support rods 152, 154, 156, 158 move from the folded position to the extended position (perpendicular to third portion 540). FIGS. 10-11 illustrate movement of rods 152, 154, 156, 158 to the extended position. FIG. 10 shows drone 100 with rods 152, 154, 156, 158 in an intermediate position between the folded position and the extended position in accordance with an embodiment. FIG. 11 shows drone 100 with rods 152, 154, 156, 158 in the extended position in accordance with an embodiment.

Figure 12:
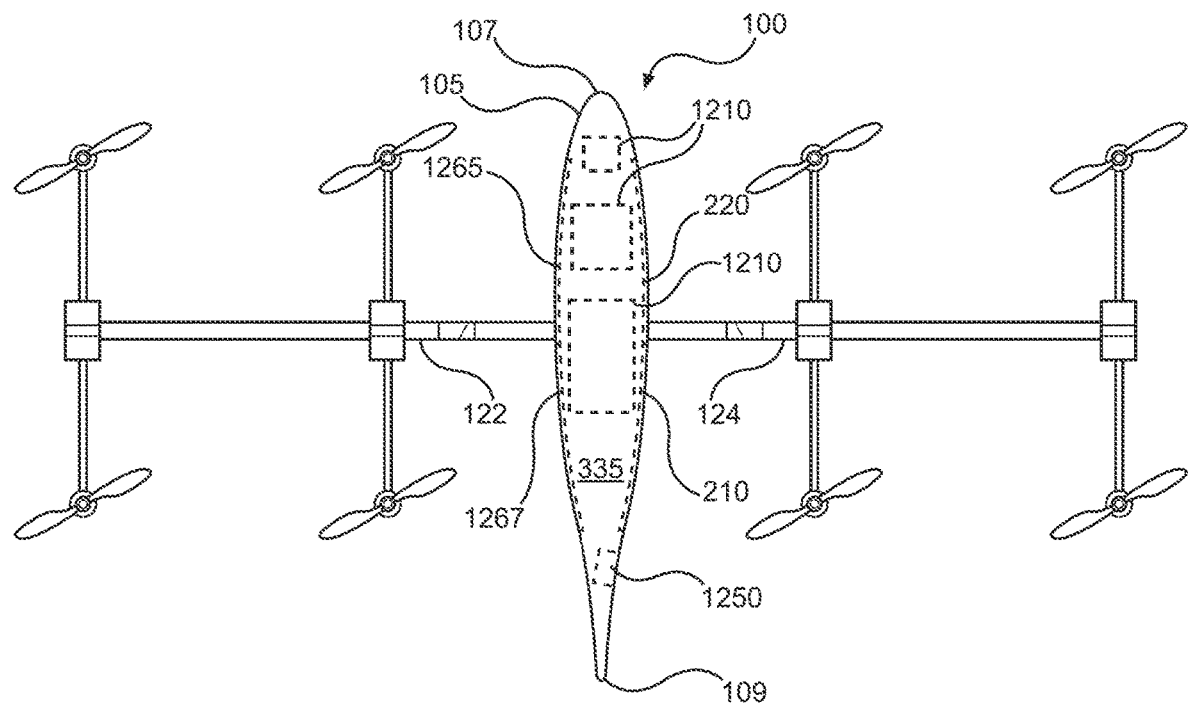
FIG. 12 shows a UAV with left and right arms in the extended position, and items of cargo disposed in cargo bay in accordance with an embodiment.

In accordance with an embodiment, drone 100 may hold cargo in cargo bay 335 when left arm 122 and right arm 124 are deployed in the extended position. FIG. 12 shows drone 100 with left and right arms 122, 124 in the extended position, and items of cargo 1210 (shown by dotted lines) disposed in cargo bay 335. Also shown in FIG. 12 are doors 210, 220 on the right side of fuselage 105, and doors 1265 and 1267 on the left side of fuselage 105. Doors 1265 and 1267 allow access to a volume within fuselage 105 adapted to house right arm 124 when left arm 122 is in a folded, stored position.

In the illustrative embodiment, drone 100 also includes a computer 1250. Computer 1250 may control the movements of left and right arms 122, 124. Computer 1250 may also control other functions of drone 100 including aspects of flight control, takeoff and landing, movements of landing gear, communications, etc. For example, computer 1250 may be a processing device that includes a processor (e.g., a central processing unit), memory, storage, input/output functionality, etc. Computer 1250 may include software adapted to control various functions of the computer.

Figure 13:
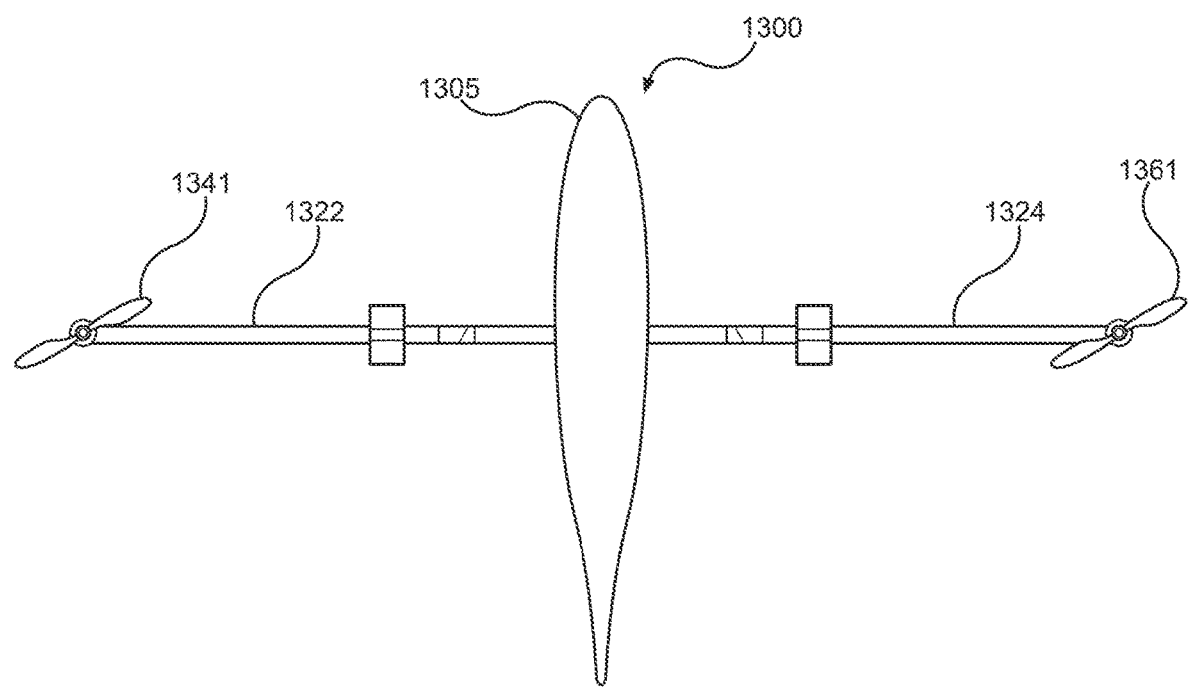
FIG. 13 shows an unmanned aerial vehicle in accordance with another embodiment.

FIG. 13 shows a drone in accordance with another embodiment. Drone 1300 includes a fuselage 1305, a left arm 1322 supporting a single propeller 1341, and a right arm 1324 supporting a single propeller 1361. Left arm 1322 and right arm 1324 are adapted to move between an extended position (shown in FIG. 13) and a stored position in a cargo bay within fuselage 1305, in a manner similar to that described herein with respect to drone 100 and shown in FIGS. 1-12.

Figure 14:
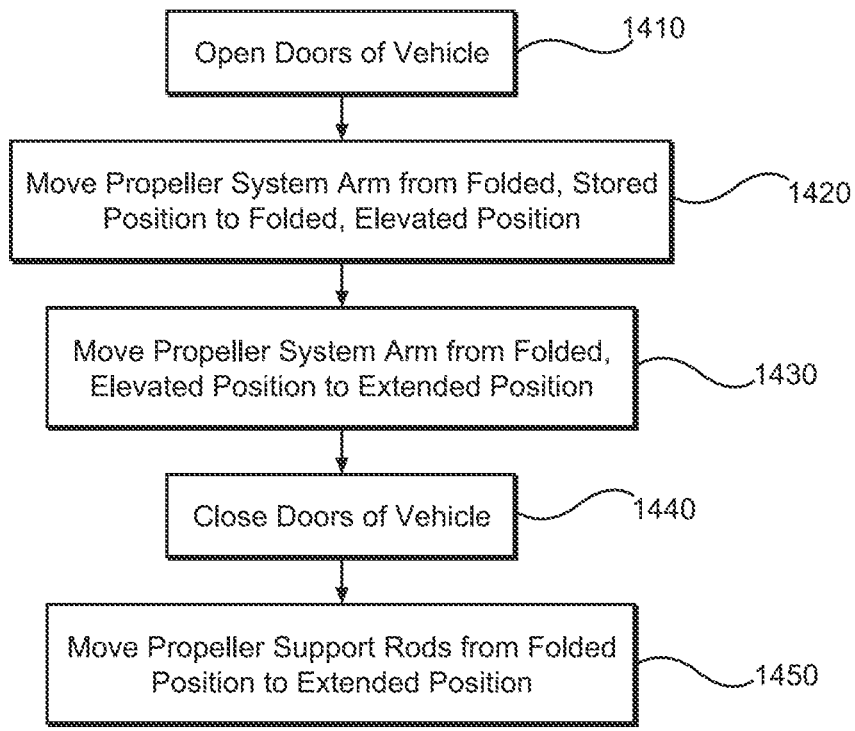
FIG. 14 shows a flowchart of a method in accordance with an embodiment.

FIG. 14 is a flowchart of a method for deploying a propeller system of an unmanned aerial vehicle from an extended position to a folded, stored position. At step 1410, the doors of the vehicle are opened. At step 1420, the propeller system arm is moved from a folded, stored position to a folded, elevated position. At step 1430, the propeller system arm is moved from the folded, elevated position to an extended position. At step 1440, the doors of the vehicle are closed. At step 1450, the propeller support rods are moved from the folded position to an extended position.

Steps for deploying the right arm of an unmanned aerial vehicle from a folded, stored position to an extended position are illustrated in the Drawings and described herein. The same or similar steps may be used to deploy a left arm of the vehicle. The same steps, or similar steps may also be used in reverse to retract an arm of an unmanned aerial vehicle from an extended position to a folded, stored position.

Figure 15:
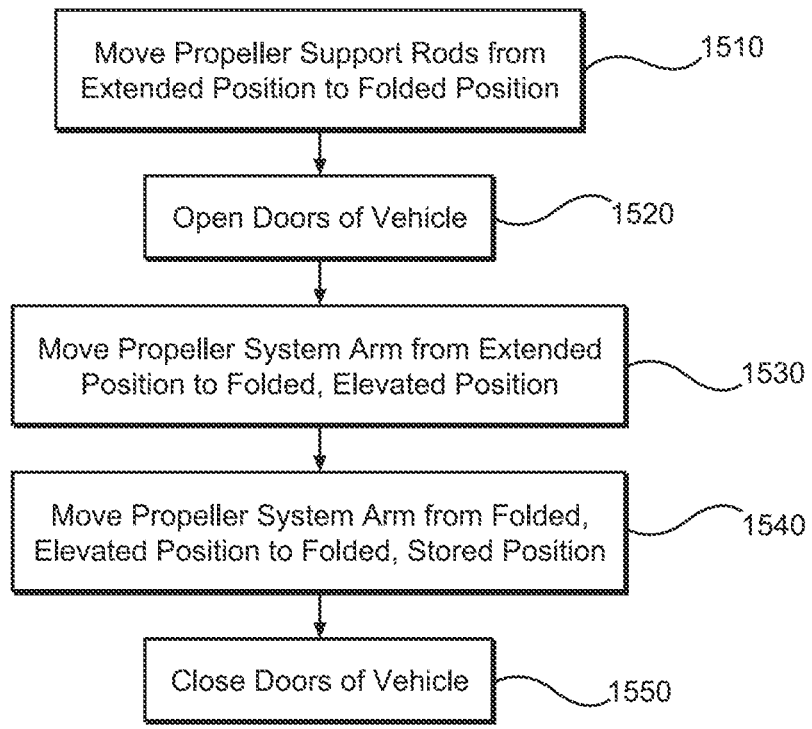
FIG. 15 shows a flowchart of a method in accordance with another embodiment.

FIG. 15 is a flowchart of a method for retracting a propeller system of an unmanned aerial vehicle from a folded, stored position to an extended position. At step 1510, the propeller support rods are moved from an extended position to a folded position. At step 1520, the doors of the vehicle are opened. At step 1530, the propeller system arm is moved from an extended position to a folded, elevated position. At step 1540, the propeller system arm is moved from the folded, elevated position to a folded, stored position. At step 1550, the doors of the vehicle are closed.

In accordance with an embodiment, a drone may include a processing device adapted to perform the method shown in FIG. 14 and the method shown in FIG. 15. For example, referring again to FIG. 12, computer 1250 may include software and/or hardware adapted to open the doors of the vehicle, move the propeller system arm from a folded, stored position to a folded, elevated position, move the propeller system arm from the folded, elevated position to an extended position, close the doors of the vehicle, and move the propeller support rods from the folded position to an extended position.

Similarly, the computer may contain software and/or hardware adapted to move the propeller support rods from an extended position to a folded position, open the doors of the vehicle, move the propeller system arm from an extended position to a folded, elevated position, move the propeller system arm from the folded, elevated position to a folded, stored position, and close the doors of the vehicle.

Thus, in accordance with an embodiment, a vehicle includes a fuselage having an internal volume and an arm adapted to move between a stored position and an extended position. The arm includes a first portion coupled to the fuselage, a second portion coupled to the first portion, and at least one propeller coupled to the second portion of the arm. The first portion and the second portion are adapted to move between a folded configuration and an extended configuration. The first portion and the second portion are in the folded configuration, and the first portion, the second portion, and the at least one propeller fit within the volume inside the fuselage, when the arm is in the stored position. The first portion and the second portion are in the extended configuration, the second portion extends outside the volume, and the at least one propeller is outside the fuselage, when the arm is in the extended position.

While the illustrative embodiment shows a retractable and extendable propeller system, in other embodiments, systems, apparatus, and methods similar to those described herein can be used with other propulsion systems.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A vehicle comprising:
a fuselage having an internal volume;
an arm adapted to move between a stored position and an extended position, wherein the arm comprises:
a first portion coupled to the fuselage; and
a second portion coupled to the first portion; and
at least one propeller coupled to the second portion of the arm;
wherein:
the first portion and the second portion are adapted to move between a folded configuration and an extended configuration;
the first portion and the second portion are in the folded configuration, and the first portion, the second portion, and the at least one propeller fit within the internal volume, when the arm is in the stored position; and
the first portion and the second portion are in the extended configuration, the second portion extends outside the internal volume, and the at least one propeller is outside the fuselage, when the arm is in the extended position;
the first portion and the second portion are in the folded configuration and define a first plane, when the arm is in the stored position;
the first portion and the second portion are in the extended configuration and define a second plane perpendicular to the first plane, when the first portion and second portion are in an extended position; and
four rods coupled to the second portion;
four propellers, each propeller coupled to a respective one of the four rods;
wherein each of the plurality of rods is adapted to move between a first, folded position and a second, extended position when the arm is in the extended position.

2. The vehicle of claim 1, wherein the internal volume is adapted to hold items of cargo when the arm is in the extended position.

3. The vehicle of claim 2, further comprising a plurality of doors disposed in a surface of the fuselage, wherein the plurality of doors are adapted to open and close, wherein the plurality of doors allow access to the internal volume when open, wherein the plurality of doors protect items inside the internal volume when closed.

4. The vehicle of claim 1, further comprising:
a plate disposed in the internal volume, the plate being attached to the fuselage;
wherein the first portion of the arm is coupled to the plate.

5. The vehicle of claim 1, wherein the vehicle is an unmanned aerial vehicle.

* * * * *